United States Patent Office 3,536,739
Patented Oct. 27, 1970

---

3,536,739
REACTION OF ALLYL DERIVATIVES WITH CARBON MONOXIDE AND 1,3 - DIENIC OLEFINS
John A. Scheben, Erlanger, Ky., assignor to National Distillers and Chemical Corporation, New York, N.Y., a corporation of Virginia
No Drawing. Original application Oct. 15, 1965, Ser. No. 496,686. Divided and this application Oct. 19, 1967, Ser. No. 701,792
Int. Cl. C07c 51/14
U.S. Cl. 260—408                                6 Claims

ABSTRACT OF THE DISCLOSURE

A process is provided for preparing 3,7-dienoyl halides, which comprises reacting a $\beta,\gamma$-unsaturated alkylene halide with carbon monoxide and a 1,3-dienyl olefin at a temperature within the range from about 20 to about 250° C. at which reaction proceeds, below the decomposition temperature of the reactants and reaction products, under a pressure within the range from about 1 to about 300 atmospheres in the presence of a platinum-palladium triad catalyst.

---

This application is a division of application Ser. No. 496,686, filed Oct. 15, 1965, and now abandoned.

This invention relates to a process for preparing 3,7-dienoyl halides by reacting allylic halides with carbon monoxide and 1,3-diene olefins in the presence of a platinum or palladium triad catalyst, and more particularly to a process for reacting allylic halides with carbon monoxide and butadiene in the presence of palladous chloride to produce 3,7-octadienoyl halides in good yield.

Chiusoli, Gazz. Chim. Ital., 89, 1332–1337 (1959), U.S. Pat. No. 3,146,256, dated Aug. 25, 1964, has described the synthesis of mono-unsaturated carboxylic acids and esters from allyl chloro derivatives and carbon monoxide or from acetylene and carbon monoxide in the presence of nickel carbonyl as a catalyst. Using allyl chloride as an exemplary, the reaction proceeds as follows:

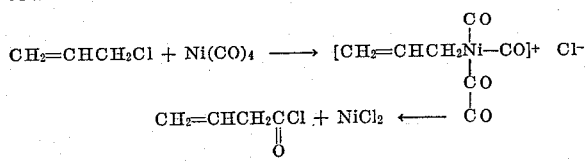

As the above reaction scheme shows, the nickel carbonyl takes part in the reaction, forming an intermediate nickel carbonyl complex with the allylic halide which can then be decomposed by the action of carbon monoxide to form the corresponding acyl halide plus nickel chloride. The nickel chloride can be returned to nickel carbonyl by hydrolysis and reaction with carbon monoxide, and sometimes this takes place in the reaction mixture, but this reverse reaction is not easy to control in a manner to obtain a quantitative yield of the carbonyl. Consequently, as Chiusoli points out, a considerable proportion of nickel carbonyl is changed to nickel chloride, and due to this and the fact that only 40% yields are obtainable, this reaction is not practical from the commercial standpoint as a method for the preparation of acyl halides from allyl chloride. The reaction is, however, of considerable theoretical interest, and it can be carried out not only with carbon monoxide but also with acetylene, which enters into the molecule in the same relative position as the carbonyl group.

When Chiusoli reacts allyl chloro-derivatives, carbon monoxide, acetylene, and water or alcohol in the presence of nickel carbonyl, there are formed unsaturated acids or esters according to the following equations:

Nickel carbonyl is partially replaced in this reaction, but the amount of nickel carbonyl added initially is fairly large, on a molar basis about one-half of the amount of the allylic halide charged.

In accordance with the instant invention, 3,7-dienoyl halides are prepared from $\beta,\gamma$-unsaturated alkylene halides by reaction with carbon monoxide and a 1,3-diene olefin in the presence of a platinum-palladium triad catalyst. The reaction proceeds under moderate conditions in accordance with one of the following schemes, according to whether the reactant is a 1,3-diene, using butadiene as illustrative:

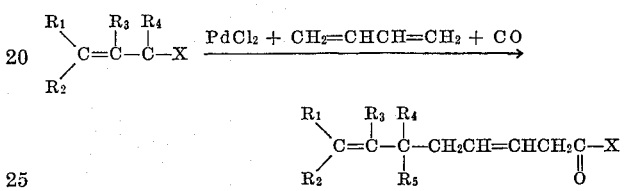

It will be apparent from the above that when butadiene is employed, the reaction product is a 3,7-dienoyl halide.

The reaction is applicable, as the above reaction scheme indicates, to any allylic or $\beta,\gamma$-unsaturated aliphatic halide having the formula set out in the first equation. In this formula, $R_1$, $R_2$, $R_3$, $R_4$, and $R_5$ can be hydrogen or an organic radical, such as an alkyl group having from one to about nine carbon atoms; an aryl group having from six to about thirty carbon atoms, including aralkyl and alkaryl groups in which each alkyl or alkylene substituent may have up to fifteen carbon atoms, and having from one to five such substituents per aryl nucleus; cycloalkyl groups having from six to about thirty carbon atoms, including alkyl-substituted cycloalkyl groups in which each alkyl substituent has up to about fifteen carbon atoms, halogen-substituted alkyl and cycloalkyl groups, the halogen including chlorine, bromine, fluorine, and iodine; and ester-substituted alkyl, aryl and cycloalkyl groups, the ester substituent being of the form COOR wherein R is as defined above for $R_1$, $R_2$, $R_3$, $R_4$, and $R_5$, hydrogen excepted. X is halogen, including chlorine, bromine, fluorine, and iodine.

While for simplicity the reaction scheme is shown using any 1,3-diene can be employed.

The 1,3-dienes can be defined by the formula:

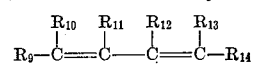

wherein $R_9$ to $R_{14}$ are as defined above for $R_1$ to $R_5$, inclusive.

As exemplary of the alkyl substituents there can be mentioned methyl, ethyl, propyl, isopropyl, butyl, isobutyl, tertiary-butyl, isoamyl n-amyl, neopentyl, tertiary-amyl, isohexyl, 2-ethylhexyl, nonyl, isononyl, tertiarynonyl, and heptyl. Exemplary aryl, aralkyl and alkaryl substituents include phenyl tolyl, xylyl, isononylphenyl, tertiaryoctylphenyl, dodecylphenyl, benzyl, $\alpha$-phenethyl, $\beta$-phenethyl, pentadecylphenyl, mesityl, phenylphenyl, and naphthyl. Exemplary cycloalkyl groups include cyclopentyl, cyclohexyl, and cycloheptyl. These substituents may include halogen, nitro and ester groups, such as, for example, chloroethyl, 4-bromocyclohexyl, nitrobenzyl, nitrophenyl, and acetylphenyl. Specific compounds include 1,4-dimethylbutadiene; 2,5-dimethyl-2,4-hexadiene; 2,3-diemthylbutadiene; 1,4-diphenylbutadiene; 1,4-dimethyl-1,4-diphenylbutadiene; isoprene; 1,3-pentadiene; 4-bromocyclohexyl butadiene; acetylphenyl butadiene, etc.

The reaction preceeds in the presence of any platinum or palladium triad catalyst, generically referred to in the claims as a "platinum-palladium triad catalyst," including, for example, platinum, palladium, osmium, iridium, rhodium, and ruthenium. Compounds of these metals can, for instance, be the salts, for example, the chloride, bromide, nitrate, sulfate, or acetate; the oxides; and organic complexes of the metal, such as for instance, the benzonitrile, bis-$\pi$-allyl, or acetylacetonate complexes. The metal or the compound of the metal can be supported on an inert carrier such as carbon, alumina, or silica. The palladium halides are particularly desirable because they are available and give excellent yield, and accordingly these are preferred, for instance, palladous chloride and palladous bromide.

Other exemplary catalysts are palladium on carbon; palladous oxide; palladous benzoate; bis(benzonitrile) palladous chloride; the chlorides or rhodium, ruthenium, platinum, iridium, and osmium; platinous acetate; rhodium oxide; palladous cyanide; rubidium carbonate; potassium chloropalladite; and palladous acetylacetonate.

Compounds known to complex with the platinum or palladium triad group meals can also be added as cocatalysts. Examples of such ligands include triphenylphosphine, pyridine, benzonitrile, and pentane-1,3-dione. Small amounts of such cocatalysts suffice to give an improved effect. Amounts within the range from about 10 to about 500 mole percent based on the weight of the catalyst can be used.

Exemplary $\beta,\gamma$-unsaturated aliphatic halides include allyl chloride, allyl bromide, $\beta$-methallyl chloride, $\beta$-metallyl bromide, $\gamma$-methallyl chloride, $\gamma$-methallyl bromide, 1-phenyl-3-chloropropene-1, 1-chloromethylcyclohexene, ethyl-2-chlorobutene-3, p-nitrocinnamylbromide, and bisallylic halides, such as 1,4-dichloro-2-butene.

The amount of catalyst is in no way critical, and very small amounts give effective results. Amounts within the range from about 0.001 to 20 molar percent based on the amount of the allylic halide can be used. Amounts within the range from about 0.001 to 5 molar percent are preferred. Two or more platinum-palladium triad catalysts can be used in admixture for advantageous effects.

The carbon monoxide is conveniently introduced in gaseous form. The reaction mixture containing the allylic halide is preferably in the liquid phase. In this event, the carbon monoxide can be bubbled into the reaction mixture, or, alternatively, if the carbon monoxide is used as an atmosphere, intermixed therewith by vigorous stirring of the reaction mixture. If the reaction is carried out under pressure in a bomb, rotation of the bomb will provide adequate mixing.

The pressure of carbon monoxide is not cirtical; however, inasmuch as the carbon monoxide reacts mole for mole with the $\beta,\gamma$-unsaturated aliphatic halide, it will of course be used in an amount of at least one mole per mole of the halide. The pressure of carbon monoxide can range from about 1 to about 300 atmospheres. The preferred pressure is within the range from about 35 to about 90 atmospheres.

The reaction proceeds at moderate temperatures, ranging from room temperature up to about 250° C. The upper limit of reaction temperature is not critical and will be determined by the decomposition temperature of the reactants and reaction products. At temperatures below 20° C., the reaction rate may be slow, but such temperatures can also be used. An optimum reaction rate is obtained within the range from about 35° to about 110° C.

An inert organic solvent can be used as a diluent and to provide the liquid phase in the case where the $\beta,\gamma$-unsaturated aliphatic halide is a gas or a solid. The reaction medium is preferably anhydrous, and, accordingly, anhydrous solvents should be used. Satisfactory solvents include the aliphatic and aromatic hydrocarbons, such as hexane, octane, decane, dodecane, petroleum ethers, benzene, toluene, xylene, and mesitylene; the chlorinated aliphatic hydrocarbons, such as ethyl chloride, butyl chloride, and 1,2-dichloroethane; ethers such as ethyl ether and dimethoxyethane; and phosphines, such as tributyl phosphine.

The molar ratio of the 1,3-dienic olefin to $\beta,\gamma$-unsaturated aliphatic halide is important in order to ensure preferential addition of the olefin to the allylic halide. The molar ratio should preferably be less than about 2. Most preferably, the weight ratio is within the range from about 0.25 to about 4 parts of the 1,3-dienic olefin per part of the allylic halide. At ratios of greater than 2 to 1, 1,3-dienic olefins tend to produce increasing amounts of 3-alkenoyl halide as a by-product with the 3,7-dienoyl halide.

At the conclusion of the reaction, the product is recovered by separating the catalyst by filtration or by centrifugal separation. Any inert solvent and unreacted $\beta,\gamma$-unsaturated aliphatic halide is removed by distillation, and the residue, which is the higher boiling 3,7-dienoyl halide, is recovered.

The process is particularly adapted for continuous operation, in which case the catalyst, $\beta,\gamma$-unsaturated aliphatic halide, any solvent, and the 1,3-dienic olefin are blended and cycled to a reactor where they are combined with carbon monoxide, held in the reactor for the required time, and then separated as before. The reactor can, if desired, be in elongated form with the traverse time equal to the reaction time. Any unreacted $\beta,\gamma$-unsaturated aliphatic halide can be recycled to the starting material.

The following examples, in the opinion of the inventor, represent preferred embodiments of his invention.

EXAMPLE 1

Palladous chloride (12.3 millimoles), allyl chloride (1.05 moles), and 1,3-butadiene (0.97 mole) were placed in the glass liner of a rocking autoclave. Carbon monoxide was added to an initial pressure of 34 atmospheres. The reactor contents were rocked and heated at 71° C. for 41.5 hours. The excess pressure was then vented, and the bomb contents filtered to separate the catalyst. The product, an unsaturated acid chloride, was 3,7-octadienoyl chloride.

The filtrate was esterified with methanol at 0° C. An ether solution of the unsaturated methyl ester was hydrogenated using a 5% palladium carbon catalyst. The ether solution was freed of catalyst and then concentrated. The saturated products were identified by vapor phase chromatography. Methyl octanoate was produced in 23% yield, and methyl valerate in 3% yield.

EXAMPLE 2

A reaction was carried out as in Example 1, but using 2.3 moles of 1,3-butadiene, 0.905 mole of allyl chloride, and 14.6 millimoles of palladous chloride. The reaction was carried out at 74° C. for twenty-four hours under an initial carbon monoxide pressure of 85 atmospheres. The yield of 3,7-octadienoyl chloride was 25%. The yield of 3-pentenoyl chloride was 24%.

The process of the invention can be used to prepare 3,7-dienoyl halides that are very difficult to prepare by other methods. These dienoyl halides are useful in the normal manner of acyl halides in that they undergo hydrolysis to form the corresponding dienoic acids and undergo esterification with alcohols to form the corresponding dienoic esters. These can be hydrogenated, if desired, to the saturated acid chlorides, acids, and esters. Furthermore, the unsaturated groups make it possible for them to undergo epoxidation reactions, so that they can form diepoxy esters or unsaturated monoepoxy esters and acids. They can also be polymerized by themselves or with other reactive monomers to form complex polymers of varying types and are useful cross-linking agents for linear polymers.

Having regard to the foregoing disclosure, the following is claimed as the inventive and patentable embodiments thereof:

1. A process for preparing 3,7-dienoyl halides which comprises reacting a halide of the general formula:

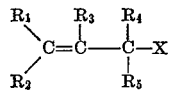

with a compound of the formula:

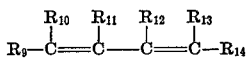

in which $R_1$, $R_2$, $R_3$, $R_4$, $R_5$, $R_9$, $R_{10}$, $R_{11}$, $R_{12}$, $R_{13}$, and $R_{14}$ are selected from the group consisting of hydrogen,
an alkyl group having from 1 to 9 carbon atoms,
an aryl group having from 6 to 30 carbon atoms,
an aralkyl or alkaryl group wherein the alkyl group has up to 15 carbon atoms, and having from 1 to 5 of such substituents per aryl nucleus,
a cycloalkyl group having from 6 to 30 carbon atoms,
an alkyl substituted cycloalkyl group with from 6 to 30 carbon atoms in the cycloalkyl group and in which each alkyl substituent has up to about 15 carbon atoms,
an halogen-substituted alkyl or cycloalkyl group in which said halogen is selected from the group consisting of chlorine, bromine, fluorine and iodine,
an ester-substituted alkyl, aryl or cycloalkyl group, the ester substituent having the form COOR, wherein R can be any of the moieties defined above for $R_1$, $R_2$, $R_3$, $R_4$, and $R_5$, hydrogen excepted;
and wherein X is a halogen selected from the group consisting of chlorine, bromine, fluorine and iodine and carbon monoxide
in the present of a catalyst selected from the group consisting of metals of the group consisting of platinum, palladium, osmium, iridium, rhodium, and ruthenium, the chlorides, bromides, nitrates, sulfates, acetates and oxides of said metals, the organic complexes of said metals with members of the group consisting of benzonitrile, bis-$\pi$ allyl and acetylacetonate, palladous benzoate, bis(benzonitrile) palladous chloride, palladous cyanide, rubidium carbonate, and potassium chloropalladite, at a temperature within the range of 20° C.–250° C. and at a pressure within the range of 1 to 300 atmospheres.

2. A process in accordance with claim 1, in which the reaction is carried out at temperatures within the range from about 35° C. to about 110° C. and at a pressure within the range of 35 to 90 atmospheres.

3. A process in accordance with claim 1, in which the molar ratio of the compounds of the formula

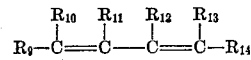

and

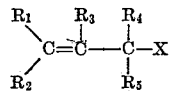

is less than about 2:1, respectively.

4. A process in accordance with claim 1 in which the amount of the catalyst is within the range from about 0.001 to about 20 molar percent, based on the weight of the compound of the formula

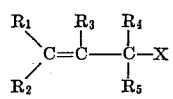

5. A process in accordance with claim 1 in which the compound of the formula

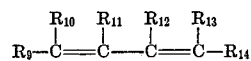

is butadiene.

6. The process of claim 1 wherein the reactants are 1,3-butadiene, allyl chloride and carbon monoxide, and the catalyst is palladous chloride.

References Cited

UNITED STATES PATENTS

| 3,146,256 | 8/1964 | Chiusoli | 260—464 |
| 3,290,397 | 12/1966 | Rust et al. | 260—654 |
| 3,309,403 | 3/1967 | Mador et al. | |
| 3,338,961 | 8/1967 | Closson et al. | |
| 3,361,811 | 1/1968 | Ihrman et al. | |

FOREIGN PATENTS 803,463  10/1958  Great Britain.

OTHER REFERENCES

Tsuji et al.: Jour. Amer. Chem. Soc. 86 (1964) pp. 4350–4353.

LEON ZITVER, Primary Examiner

H. T. MARS, Assistant Examiner